United States Patent Office 2,707,716
Patented May 3, 1955

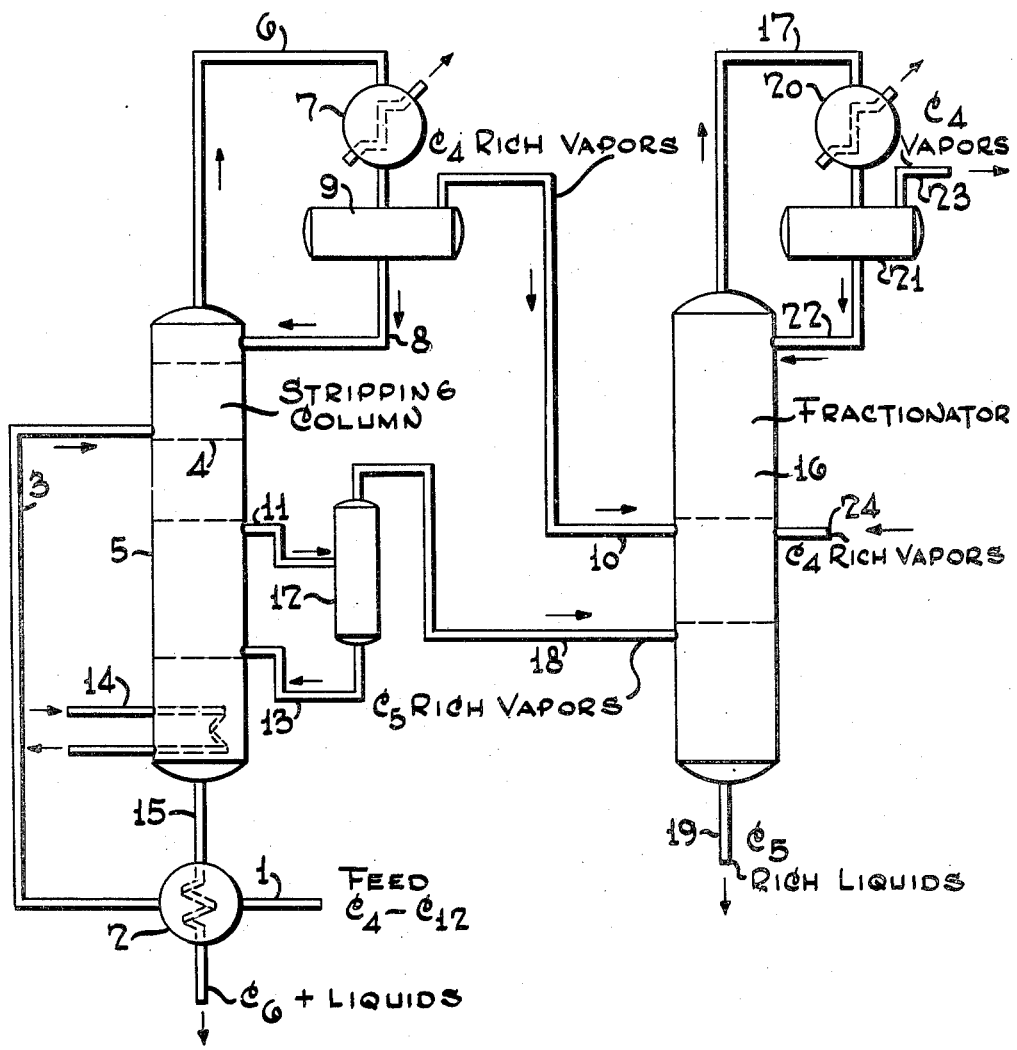

2,707,716

PROCESS OF SEPARATING C₅ DIOLEFINS FROM HIGHER AND LOWER DIOLEFINS

Lewis C. Price, Baton Rouge, La., assignor to Esso Research and Engineering Company, a corporation of Delaware Application September 7, 1951, Serial No. 245,567

3 Claims. (Cl. 260—666)

The process of this invention is concerned with an efficient separation and recovery of cyclopentadiene and isoprene from a cracked hydrocarbon fraction containing higher-boiling hydrocarbons and lower-boiling hydrocarbons including butadiene.

It has now been found that an important factor in the efficiency of separation of cyclopentadiene and isoprene from other diolefins is the period (time) of contact of the cyclopentadiene and isoprene with other diolefins at temperatures conducive to their interpolymerization. As the time of contact between cyclopentadiene and the other diolefins is shortened, particularly between these compounds concentrated in the liquid phase at elevated temperatures in the neighborhood of 200°–220° F. conducive to their interpolymerization, the efficiency of the separation becomes greatly increased.

Prior to the present invention, a stripping column was operated to strip the $C_4$ hydrocarbons including butadiene overhead from a cracked light naphtha condensate principally containing butadiene, isoprene, cyclopentadiene, piperylene, and methyl cyclopentadiene as reactive conjugated diolefins. The $C_4$ overhead contained some $C_5$ also. The bottoms from this column contained cyclopentadiene and isoprene which were sent to gasoline.

As a result of the present invention, a vapor side stream containing cyclopentadiene and isoprene in a $C_5$–$C_6$ fraction is removed from a point between the feed plate and the bottom of this column. The withdrawal of the vapor side stream is advantageously accomplished by increasing the bottoms temperature of the stripping column. The vapor side stream is fed to a second tower which receives the $C_4$ overhead stream from the stripping column and fractionates overhead all $C_4$ hydrocarbons. The bottoms from the second tower thus give the yields of isoprene and cyclopentadiene highly improved as compared to the former operation in which the isoprene and cyclopentadiene were allowed to remain in the bottoms from the stripping column.

A preferred plant scale embodiment of the invention will be described with reference to the accompanying drawing that shows a schematic flow plan of the operation.

With reference to the drawing, the cracked hydrocarbon condensate containing butadiene, isoprene, and $C_5$–$C_6$ cyclodienes diluted by higher boiling hydrocarbons is fed into line 1 through heat exchanger 2 and then is introduced by line 3 at a temperature less than about 275° F. onto a feed plate 4 in the upper part of the stripping column 5. In this upper part of the stripping column 5, the $C_4$–$C_5$ hydrocarbon components evolved as vapors at 210° F., in a short residence period of less than 100 seconds undergo a rough fractionation before they are taken overhead from column 5 at about 165° F. through line 6 to a cooling condenser 7 where the vapors are cooled quickly to below 155° F. at 105 p. s. i. g. for partial condensation. In this partial condensation only such amounts of condensate are formed as are desired for refluxing to the upper part of the stripping column 5 by line 8 from the condensate receiver 9.

The amount of refluxing can be controlled so that very little $C_5$ hydrocarbons are left uncondensed to be withdrawn with the uncondensed $C_4$ hydrocarbon vapors from receiver 9 by line 10.

The unvaporized portion of the liquid feed injected onto the feed plate 4 in the stripping column 5 flows downwardly past a few plates in the stripping section of column 5 to accomplish further vaporization of mainly $C_5$ and $C_6$ hydrocarbon components. A substantial portion of vapors evolved in the stripping section below the feed plate are withdrawn as a vapor side-stream at about 270° F.–280° F. through line 11. This vapor side-stream is mainly constituted of $C_5$ and $C_6$ hydrocarbons but will include a small amount of $C_4$ components on account of the rough fractionation.

The side-stream of $C_5$ rich vapors may be preferably passed by line 11 into a knockout drum 12 for the purpose of knocking out a small amount of entrained liquid. The liquid $C_6+$ hydrocarbons precipitated in the knockout drum 12 may be returned to a bottom part of the stripping column 5 by line 13. The residual liquid in the bottom part of column 5 is subjected to reboiling by heat from a heating coil 14. Bottom residue is withdrawn from stripping column 5 through line 15 and is passed through the heat exchanger 2 for imparting heat to the initial feed.

Although the overhead $C_4$ rich vapor product and the side-stream $C_5$ rich vapor product from the stripping column 5 may be separately processed, there is a substantial gain of efficiency if these two vapor streams are next subjected to a further fractionation in a single fractionating column, such as fractionating column 16. There is a substantial gain in economy of equipment and heat energy requirements without impairing the yield and quality of products by using the single fractionating column for the two vapor streams, particularly if the overhead $C_4$ rich vapor stream is introduced several plates above the plate on which the side-stream $C_5$ rich vapor is introduced into the column 16, as indicated in the drawing. $C_4$ vapors introduced by line 10 into column 16 rapidly ascend through a number of fractionating plates to be taken overhead by line 17. The relatively small amount of $C_4$ vapors introduced by the side-stream vapor line 18 from the knockout drum 12 join the $C_4$ vapors passing up through column 16. Any small amount of $C_5$ hydrocarbons introduced into column 16 from line 10 are fractionally condensed and flow downwardly to join the condensate of the $C_5$ hydrocarbons from the side-stream vapor line 18 and this condensate forms the bottoms fraction in column 16 which is withdrawn by line 19.

The bottoms residual liquid product withdrawn by line 19 from column 16 will contain a negligible amount of $C_4$ hydrocarbons and mainly $C_5$ hydrocarbons including the desired isoprene and cyclopentadiene (about 80 volume percent $C_5$ hydrocarbons). A relatively smaller amount of $C_6$ cyclodienes will be present in these bottoms as monomers and dimers. Very small amounts of $C_6$ to $C_9$ hydrocarbons will be present in these bottoms. Accordingly when these bottoms are subjected first to a moderate temperature soaking to dimerize the cyclodiene monomers at about 200° F. to 220° F. for a period of 4 to 8 hours, the dimerization of the cyclodienes is highly selective. Thereafter on fractionating the dimerized bottoms from column 16 a cyclopentadiene dimer-rich concentrate that meets specification requirements is recovered, while the isoprene is fractionally distilled therefrom and is ready for purification by extractive distillation.

The cyclopentadiene dimer concentrate obtained by the procedure described should meet the requirements of containing at least 87% of cyclopentadiene and methyl cyclopentadiene dimers, the weight of the cyclopentadiene dimers being at least 6 times as great as the methyl cyclopentadiene dimers. By meeting these requirements, the concentrate is useful for a number of industrial purposes, such as extenders for vegetable drying oils and intermediates for chlorination in producing insecticides, etc.

The butadiene-rich vapors taken overhead through line 17 are subjected to partial condensation as they pass through cooler 20 to form reflux condensate which is returned to the upper part of column 16 from the receiver 21 through reflux line 22. About 65% of the overhead may be refluxed in this manner to maintain the overhead vapor temperature at 130° F. The uncondensed portion of the overhead vapor product is removed through line 23 to facilities where the butadiene is extracted.

The fractionator column 16 can be used to fractionate a surprisingly large volume of material in the manner described, for even an additional vapor stream containing some $C_5$ components but mainly lighter hydrocarbon components may be introduced for example by line 24 above or below the feed point of the line 10 stream depending upon the relative amounts of $C_5$ hydrocarbons present, i. e., as the stream is richer in $C_5$ and higher hydrocarbons it should be introduced closer to the bottom of column 16.

It is to be understood that the principles of this invention can be applied with variations in the distillation apparatus, conditions of temperatures and pressures in the distillation apparatus, and variations in the reflux ratios depending on the particular feed stocks, although the following example sets forth in detail the manner in which the invention was demonstrated on an industrial scale.

*Example*

The process was put into operation on a light naphtha feed stock made by steam-cracking virgin gas oil. This light naphtha fraction was liquefied from vapors by compression and cooling under conditions that allowed the $C_1$ to $C_3$ hydrocarbons and a large part of the $C_4$ hydrocarbons to remain in the vapor phase. The liquefied light naphtha fraction containing some $C_4$ hydrocarbons and higher hydrocarbons was fed onto the 14th plate from the top of a stripping column having 25 plates. The stripping column was operated under a pressure of 105 pounds per square inch gauge with a bottoms temperature of about 310° F. to 315° F. and overhead vapor temperature at 160° F.–165° F. Two-thirds of the overhead vapors were partially condensed and refluxed to the top of the column. A vapor side-stream was withdrawn near the 19th plate from the top of the stripping column at about 270° F. to remove additional cyclopentadiene monomer vapors and isoprene which would otherwise be lost to the bottoms. This vapor side stream was fed near the 26th of 30 plates of a fractionating column which received the uncondensed overhead vapors of mainly $C_4$ hydrocarbons from the stripping column on its 23rd plate from the top. The second column was operated under a pressure of 85 p. s. i. g. with a bottoms temperature of 235° F. to accomplish complete withdrawal overhead of $C_4$ hydrocarbons with slight loss of $C_5$ hydrocarbons. The bottoms fraction from the second column was subjected to dimerization and fractionation to recover the desired dimer concentrate and overhead isoprene-rich distillate. It was found that the operation was highly successful with the result of increasing the output of specification grade cyclopentadiene dimer concentrate by more than 20% and increasing the recovery of isoprene. The recovered dimer concentrate contained 88 weight percent of the mixed $C_5$–$C_6$ cyclodiene dimers in which the cyclopentadiene dimers were in a ratio of 6.5:1 of the methyl cyclopentadiene dimers. The dimer concentrate was satisfactorily free of colored interpolymers and high-boiling contaminants.

In the satisfactory operation, the liquid hydrocarbon mixtures containing high concentrations (above 15%) of $C_4$ hydrocarbons with $C_5$ hydrocarbons present were kept at temperatures no higher than about 210° F., as in the upper part of the stripping column and in the subsequent fractionating above the $C_5$ rich vapor inlet. A remarkably sharp separation was accomplished in the fractionating column maintained at a somewhat lower pressure than the preceding stripping column.

Having described the invention it is claimed as follows:

1. The process of separating a $C_5$ mixture of isoprene with cyclopentadiene from a cracked naphtha fraction containing them together with butadiene, methyl cyclopentadiene, and higher-boiling hydrocarbons, which comprises passing said naphtha fraction into an upper part of a stripping column wherein $C_4$–$C_5$ hydrocarbons principally rich in $C_4$ hydrocarbons including the butadiene are stripped and distilled overhead, removing from said stripping column at a point below its feed inlet a vapor side-stream rich in $C_5$ hydrocarbons including the isoprene and cyclopentadiene with minor amounts of $C_4$ and $C_6$ hydrocarbons, passing into an intermediate part of a second fractionating column a stream of overhead vapors rich in $C_4$ hydrocarbons including the butadiene from the first column and injecting into a lower part of said second column the vapor side-stream rich in $C_5$ hydrocarbons from the first column, distilling overhead from the second column a $C_4$ hydrocarbon fraction and recovering as bottoms from the second column a liquid mixture containing cyclopentadiene and isoprene substantially freed of $C_4$ hydrocarbons.

2. The process of separating $C_4$–$C_6$ diolefins including butadiene, isoprene, and cyclopentadiene from a cracked naphtha fraction, which comprises passing said naphtha fraction into an upper part of a stripping column under conditions for vaporizing most of the $C_4$ hydrocarbons including the butadiene with a minor amount of the $C_5$ hydrocarbons, rapidly distilling vaporized $C_4$ and $C_5$ hydrocarbons overhead from said stripping zone, vaporizing mainly $C_5$ hydrocarbons including the isoprene and cyclopentadiene from the naphtha fraction as it flows downwardly from its feed inlet in the stripping column, removing a vapor side-stream containing mainly $C_5$ hydrocarbons including the isoprene and cyclopentadiene with minor amounts of $C_4$ and $C_6$ hydrocarbons from the stripping column below the feed inlet of the said naphtha fraction, partially condensing $C_5$ hydrocarbons from the vapors taken overhead from the stripping column, refluxing partial condensate of said overhead vapors from the stripping column to an upper part of said stripping column, precipitating $C_6$+ hydrocarbon liquids entrained in said vapor side-stream, passing the remaining part of said vapor side-stream from the stripping column freed of the entrained $C_6$+ hydrocarbon liquids into a bottom part of a fractionating column, passing overhead vapors rich in $C_4$ hydrocarbons remaining after said partial condensation into an upper part of said fractionating column, distilling overhead from said fractionating column $C_4$ hydrocarbons, and recovering as bottoms from said fractionating column a liquid hydrocarbon mixture rich in $C_5$ hydrocarbons including the isoprene and cyclopentadiene but substantially freed of $C_4$ hydrocarbons.

3. The process of separating isoprene with cyclopentadiene from a cracked naphtha fraction containing them together with butadiene, methyl cyclopentadiene and higher-boiling hydrocarbons, which comprises introducing said naphtha fraction into an upper part of the stripping column wherein $C_4$–$C_5$ hydrocarbons are vaporized at temperatures up to about 210° F. and distilled overhead at temperatures up to 165° F., partially condensing mainly $C_5$ hydrocarbons from the $C_4$–$C_5$ hydrocarbon vapors taken overhead from the stripping column to obtain a remaining $C_4$ rich vapor stream including the butadiene, vaporizing mainly $C_5$ hydrocarbons with minor amounts of $C_4$ and $C_6$ hydrocarbons at 270° F. to 280° F. from a residual liquid part of the naphtha fraction passing down through the stripping column from its feed inlet thereto, removing a vapor side-stream rich in $C_5$ hydrocarbons including the isoprene and cyclopentadiene from said stripping column below said feed inlet, passing said vapor side-stream rich in $C_5$ hydrocarbons into a bottom part of a fractionating column, passing said remaining overhead vapor stream rich in $C_4$ hydrocarbons from the stripping column to an upper part of said fractionating column, distilling $C_4$ hydrocarbons overhead from said fractionating column, and withdrawing a residual fraction rich in $C_5$ hydrocarbons including the isoprene and cyclopentadiene and substantially freed of $C_4$ hydrocarbons from a bottom part of said fractionating column.

References Cited in the file of this patent

UNITED STATES PATENTS

| | | |
|---|---|---|
| 2,387,993 | Hepp | Oct. 30, 1945 |
| 2,426,706 | Patterson | Sept. 2, 1947 |
| 2,430,137 | Oblad et al. | Nov. 4, 1947 |
| 2,534,013 | Garrett | Dec. 12, 1950 |